United States Patent
Bock et al.

(10) Patent No.: US 8,374,706 B2
(45) Date of Patent: Feb. 12, 2013

(54) METHOD FOR MOVING A MACHINE ELEMENT OF AN AUTOMATION MACHINE AND A DRIVE SYSTEM

(75) Inventors: Marco Bock, Magdeburg (DE); Wolfgang Papiernik, Neunkirchen (DE)

(73) Assignee: Siemens Aktiengesellschaft, München (DE)

( * ) Notice: Subject to any disclaimer, the term of this patent is extended or adjusted under 35 U.S.C. 154(b) by 71 days.

(21) Appl. No.: 13/024,699

(22) Filed: Feb. 10, 2011

(65) Prior Publication Data

US 2012/0143354 A1 Jun. 7, 2012

(30) Foreign Application Priority Data

Feb. 11, 2010 (DE) .................. 10 2010 001 829

(51) Int. Cl.
*G05B 11/01* (2006.01)
(52) U.S. Cl. .......... 700/13; 700/159; 700/170; 700/169; 700/160; 700/172; 700/173; 700/174; 700/47; 700/19
(58) Field of Classification Search ................... None
See application file for complete search history.

(56) References Cited

U.S. PATENT DOCUMENTS

| | | | |
|---|---|---|---|
| 5,109,148 A * | 4/1992 | Fujita et al. | 219/121.82 |
| 5,262,707 A * | 11/1993 | Okazaki et al. | 318/592 |
| 5,751,585 A | 5/1998 | Cutler | |
| 5,798,927 A | 8/1998 | Cutler | |
| 5,801,939 A * | 9/1998 | Okazaki | 700/56 |
| 6,982,536 B2 * | 1/2006 | Geissdorfer et al. | 318/632 |
| 7,319,910 B2 * | 1/2008 | Papiernik | 700/63 |
| 7,482,776 B2 * | 1/2009 | Scholich-Tessmann | 318/575 |
| 7,710,060 B2 * | 5/2010 | Cardinale et al. | 318/568.1 |
| 7,869,898 B2 * | 1/2011 | Scholich-Tessmann | 700/192 |
| 7,902,785 B2 * | 3/2011 | Denk et al. | 318/573 |
| 2004/0183494 A1 * | 9/2004 | Nagaoka et al. | 318/632 |
| 2006/0186845 A1 * | 8/2006 | Terada et al. | 318/432 |

FOREIGN PATENT DOCUMENTS

| | | |
|---|---|---|
| DE | 3708266 A1 | 9/1987 |
| DE | 10355614 A1 | 7/2005 |
| DE | 102005061570 A1 | 7/2007 |
| DE | 102006056080 A1 | 5/2008 |
| EP | 1688807 A1 | 8/2006 |

OTHER PUBLICATIONS

S. Staroselsky, K.A. Stetson: Two-Stage Actuation for Improved Accuracy of Contouring; Productivity Center, Departm. of Mechanical Engineering, Univ. of Minnesota, Minneapolis, MN 55455; WA4—12:15; pp. 127-132; Others; 1988.

* cited by examiner

*Primary Examiner* — Sean Shechtman
*Assistant Examiner* — Christopher E Everett
(74) *Attorney, Agent, or Firm* — Henry M. Feiereisen, LLC

(57) ABSTRACT

In a method for moving a machine element of an automation machine with separately controlled drive shafts moving in a common direction, a first controller receives a first desired control variable, which is filtered using a filter having a frequency-dependent transfer function. In one embodiment, first desired control variable represents an overall movement of a machine element. A difference is determined between the filtered first desired variable and a first actual variable, and the difference is supplied as a desired control variable to the second controller for controlling the movement of the second drive shaft. In another embodiment, the filtered first desired variable and a second desired variable are added to form a sum, and a difference between the formed sum and the first actual variable is supplied as a desired control variable to the second controller for controlling the movement of the second drive shaft.

8 Claims, 7 Drawing Sheets

METHOD FOR MOVING A MACHINE
ELEMENT OF AN AUTOMATION MACHINE
AND A DRIVE SYSTEM

CROSS-REFERENCES TO RELATED
APPLICATIONS

This application claims the priority of German Patent Application, Serial No. 10 2010 001 829.5 filed Feb. 11, 2010, pursuant to 35 U.S.C. 119(a)-(d), the content of which is incorporated herein by reference in its entirety as if fully set forth herein.

BACKGROUND OF THE INVENTION

The present invention relates to a method for moving a machine element of an automation machine and to a drive system.

The following discussion of related art is provided to assist the reader in understanding the advantages of the invention, and is not to be construed as an admission that this related art is prior art to this invention.

Machine tools, in particular, are often provided with so-called redundant kinematics. In this case, redundant kinematics are understood as meaning the possibility of moving a machine element, which may be in the form of a tool receiving apparatus or a tool which is clamped in the tool receiving apparatus for example, along a direction with the aid of two separate drive shafts.

FIG. 1 uses a schematically illustrated machine tool 36 to illustrate the principle of redundant kinematics. A carrier 5 can be moved in a direction X with the aid of two linear motors 3 and 4. The guidance of the movement in the X direction is ensured by two columns 1 and 2 in this case. A further column 6 which is used to guide the movement of a second linear motor 7 is fastened to the carrier 5. The linear motor 7 likewise moves in the X direction. The direction of movement of the linear motors 3, 4 and 7 is indicated by depicted arrows 37, 12 and 13. A machine element 8 which is in the form of a tool receiving apparatus within the scope of the exemplary embodiment is fitted to the linear motor 7. A tool 9 is clamped in the tool receiving apparatus.

It goes without saying that the machine tool 36 also has further motors which allow a movement of the machine element 8, for example in the Y and Z directions, but are not illustrated in FIG. 1 for the sake of clarity and since they are irrelevant to understanding the invention.

In order to measure a first actual variable $x_{c,ist}$ which indicates the position of the column 6 with respect to a stationary machine bed 35 of the machine, the machine 36 has a first measuring device which is not illustrated in FIG. 1 for the sake of clarity. In order to measure a second actual variable $x_{f,ist}$ which indicates the position of the machine element 8 with respect to the column 6, the machine tool 36 has a second measuring device which is likewise not illustrated in FIG. 1 for the sake of clarity.

If the machine element 8 is intended to be moved to a particular desired position value in the direction X, the problem arises of how the movement required for this purpose is intended to be divided between the two linear motors 3 and 4 and the linear motor 7. Since the linear motor 7 must move only small masses (machine element 8 and tool 9), it is able to carry out dynamic movements (for example movements with high accelerations) in the X direction, whereas the two linear motors 3 and 4 can carry out only relatively sluggish movements on account of the larger masses to be moved by them. It is therefore expedient to divide the movement of the machine element into a first movement component, which is carried out by the two linear motors 3 and 4, and a second movement component which is carried out by the linear motor 7. In this case, the first movement component comprises the movement processes which are not very dynamic, that is to say the low-frequency movement processes, whereas the second movement component comprises the dynamic, that is to say high-frequency, movement processes of the machine element.

FIG. 2 illustrates a schematic block illustration of a drive system which is known to be commercially available for the machine tool 36. A desired variable generating unit 15 which is generally part of a control device 14, which may be in the form of a CNC controller for example, generates a first desired variable $x_{soll}$ which is in the form of a desired position variable within the scope of the exemplary embodiment according to FIG. 1 and indicates the desired position of the machine element 8 with respect to the machine bed 35. The first desired variable $x_{soll}$ is supplied, as a controlled desired variable for regulating the first movement component of the machine element 8, to a first regulating means 16a. The first actual variable $x_{c,ist}$ which is measured using a first measuring device 10 and indicates the position of the column 6 with respect to the machine bed 35 within the scope of the exemplary embodiment according to FIG. 1 is also supplied to the first regulating unit 16a as a controlled actual variable. The first actual variable $x_{c,ist}$ indicates the first movement component of the machine element 8 by indicating the position of the column 6 with respect to the machine bed 35 within the scope of the exemplary embodiment according to FIG. 1.

The first regulating means 16a drives a first power converter 17a, which is illustrated by an arrow 18a in FIG. 2, in accordance with the first desired variable $x_{soll}$ and the first actual variable $x_{c,ist}$. The first desired variable $x_{soll}$ is the controlled desired variable for regulating the first movement component of the machine element 8. The first power converter 17a accordingly drives the two linear motors 3 and 4, which is illustrated by an arrow 19a, the linear motors 3 and 4 moving a load 19. In this case, the load 19 comprises all elements which are moved by the linear motors 3 and 4 in the direction X. The first regulating means 16a, the first power converter 17a, the linear motors 3 and 4, the load 19 and the measuring device 10 form a first drive shaft 20a which is used to carry out the first movement component of the machine element 8.

In order to regulate the second movement component of the machine element 8, the so-called contouring error s is determined in the prior art by subtracting the first actual variable $x_{c,ist}$ from the first desired variable $x_{soll}$ using a subtractor 22. The contouring error s is supplied, as a controlled desired variable for regulating the second movement component of the machine element 8, to a second regulating means 16b. The second actual variable $x_{f,ist}$ which is measured using a second measuring device 11 and indicates the position of the machine element 8 with respect to the column 6 within the scope of the exemplary embodiment according to FIG. 1 is also supplied to the second regulating unit 16b as a controlled actual variable. The second actual variable $x_{f,ist}$ indicates the second movement component of the machine element 8 by indicating the position of the machine element 8 with respect to the column 6 within the scope of the exemplary embodiment according to FIG. 1.

The second regulating means 16b drives a second power converter 17b, which is illustrated by an arrow 18b in FIG. 2, in accordance with the contouring error s and the second actual variable $x_{f,ist}$. The second power converter 17b accordingly drives the linear motor 7, which is illustrated by an arrow 19b, the linear motor 7 moving a load 21. In this case, the load 21 comprises all elements which are moved by the linear motor 7 in the direction X. The second regulating means 16b, the second power converter 17b, the linear motor 7, the load 21 and the measuring device 11 form a second drive shaft 20b which is used to carry out the second movement component of the machine element 8.

It is noted at this point that the desired variable generating unit 15 likewise generates corresponding desired values for controlling the movement of the drive shafts which are used to move the machine element in the Y and Z directions. These desired values and the drive shafts which are used to move the machine element in the Y and Z directions are not illustrated in FIG. 2 and the subsequent figures for the sake of clarity and since they are irrelevant to understanding the invention.

FIG. 3 again illustrates the drive system shown in FIG. 2 in a simplified manner in the form of a block function diagram. In this case, the same elements are provided with the same reference symbols as in FIG. 2. In this case, the first drive shaft 20a has a transfer function G(s) and the second drive shaft 20b has a transfer function F(s). The overall position $x_{ist}$ of the machine element 8, that is to say its position with respect to the machine bed 35 (see FIG. 1), results from adding the first actual variable $x_{c,ist}$ and the second actual variable $x_{f,ist}$.

FIG. 4 illustrates another drive system which is known from the prior art, in which a movement is divided into a first movement component and a second movement component. The embodiment according to FIG. 4 is identical to the embodiment according to FIG. 2 insofar as it relates to the first drive shaft 20a and the second drive shaft 20b. In FIG. 4, the same elements are therefore provided with the same reference symbols as in FIG. 2. The fundamental difference in the embodiment according to FIG. 4 is that the control device 14' has been extended by a dividing unit 23 in comparison with the control device 14 according to FIG. 2. The desired variable generating unit 15 generates a desired variable $x'_{soll}$, which corresponds to the first desired variable $x_{soll}$ according to FIG. 2. The dividing unit 23 uses the desired variable $x'_{soll}$ to determine a first desired variable $x_{c,soll}$, which is supplied to the regulating means 16a as a controlled desired variable, and a second desired variable $x_{f,soll}$ which is supplied to the regulating means 16b as a controlled desired variable.

FIG. 5 again illustrates the control device 14' and, in particular, the dividing unit 23 in detail, the same elements in FIG. 5 being provided with the same reference symbols as in FIG. 4. In order to divide the movement, the desired variable $x'_{soll}$ is filtered using a low-pass filter 24 and the first desired variable $x_{c,soll}$ for the first drive shaft 20a is generated in this manner. The first desired variable $x_{c,soll}$ is subtracted from the desired variable $x'_{soll}$ using a subtractor 26 and the second desired variable $x_{f,soll}$ for the second drive shaft 20b is generated in this manner.

FIG. 6 illustrates another implementation of the dividing unit, which is known from the prior art, in the form of the dividing unit 23'. In FIG. 6, the same elements are provided with the same reference symbols as in FIG. 5. The embodiment according to FIG. 6 differs from the embodiment according to FIG. 5 only in that, in order to compensate for the temporal delay in the desired variable $x_{c,soll}$, as caused by the low-pass filter 24, the desired variable $x'_{soll}$ is delayed by a particular time using a delay unit 25 before it is supplied to the subtractor 26 as an input variable.

FIG. 7 again illustrates the drive system shown in FIG. 6 in a simplified manner. In this case, the same elements are provided with the same reference symbols as in FIG. 6. In this case, the first drive shaft 20a has a transfer function G(s) and the second drive shaft 20b has a transfer function F(s). The overall position $x_{ist}$ of the machine element 8, that is to say its position with respect to the machine bed 35, results from adding the first actual variable $x_{c,ist}$ and the second actual variable $x_{f,ist}$.

With conventional methods, the overall dynamics of the machine are determined by the regulating dynamics of the sluggish first drive shaft (coarse drive shaft). The potential of the dynamic second drive shaft (fine drive shaft) is thus not fully exploited.

Relatively large contour errors also generally occur in the known movement dividing methods. Overshooting when the desired variable changes rapidly and contour expansion in the case of circular contours to be traced by the machine element often occur in the known methods, for example.

An egg-shaped contour thus results from a circular contour to be traced by the machine element, for example.

It would therefore be desirable and advantageous to provide an improved to obviate prior art shortcomings and to move a machine element of an automation machine having redundant kinematics, during which contour errors of a contour to be traced by the machine element are reduced.

The contour error is here the difference between a predefined desired contour and the actual contour actually traced by the machine element.

The invention also makes it possible to increase the dynamics of the movement of the machine element.

SUMMARY OF THE INVENTION

According to one aspect of the present invention, a method for moving a machine element of an automation machine having a first drive shaft performing a first movement component and a second drive shaft performing a second movement component, wherein the first and second movement components have a common direction and are controlled by separate first and second controllers, includes the steps of supplying to the first controller as a desired control variable a first desired value, supplying to the first controller as an actual control variable a first actual value representing the first movement component, and filtering the first desired variable using a filter having a frequency-dependent transfer function to generate a filtered first desired variable.

According to one embodiment of the method, the first desired variable represents an overall movement, which is composed of the first and second movement components, and a difference is determined between the filtered first desired variable and the first actual variable, and the difference is supplied to the second controller as a desired control variable for controlling the second movement component.

According to another embodiment of the method, the first desired variable represents the first movement component, and the filtered first desired variable and a second desired variable are added to form a sum, and a difference between the formed sum and the first actual variable are supplied to the second controller as a desired control variable for controlling the second movement component.

According to another aspect of the invention, a drive system for moving a machine element of an automation machine includes a first drive shaft moving the machine element with a first movement component and a second drive shaft moving the machine element with a second movement component in a common direction relative to the first movement component. The drive system further includes a first controller controlling movement of the first drive shaft and a second controller controlling movement of the second drive shaft, wherein the first controller receives a first desired variable and a first actual value representing the first movement component as an actual control variable, and a filter having a frequency-dependent transfer function filtering the first desired variable and generating a filtered first desired variable.

According to one embodiment of the drive system, the first desired variable represents an overall movement, which is composed of the first and second movement components, and a subtractor forms a difference between the filtered first desired variable and the first actual variable and supplies the difference to the second controller as a desired control variable for controlling the second movement component of the second drive shaft.

According to another embodiment of the drive system, the first desired variable represents the first movement component, an adder adds the filtered first desired variable and a second desired variable to form a sum; and a subtractor then forms the difference between the sum and the first actual variable and supplies the difference to the second controller as a desired control variable for controlling the second movement component of the second drive shaft.

Advantageously, the frequency-dependent transfer function V(s) of the filter may be for all intents and purposes $$V(s) = 1 + G(s) - \frac{G(s)}{F(s)},$$

wherein G(s) is the transfer function of the first drive shaft and F(s) is the transfer function of the second drive shaft and $$s = j \cdot 2 \cdot \pi \cdot f + \sigma,$$

wherein f is the frequency and j is the imaginary unit and σ is the real part of s, since contour errors which then occur are particularly small.

The automation machine may be in the form of a machine tool, which typically requires a high degree of precision in the movement of machine elements. However, the invention may also be used in other types of automation machines.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
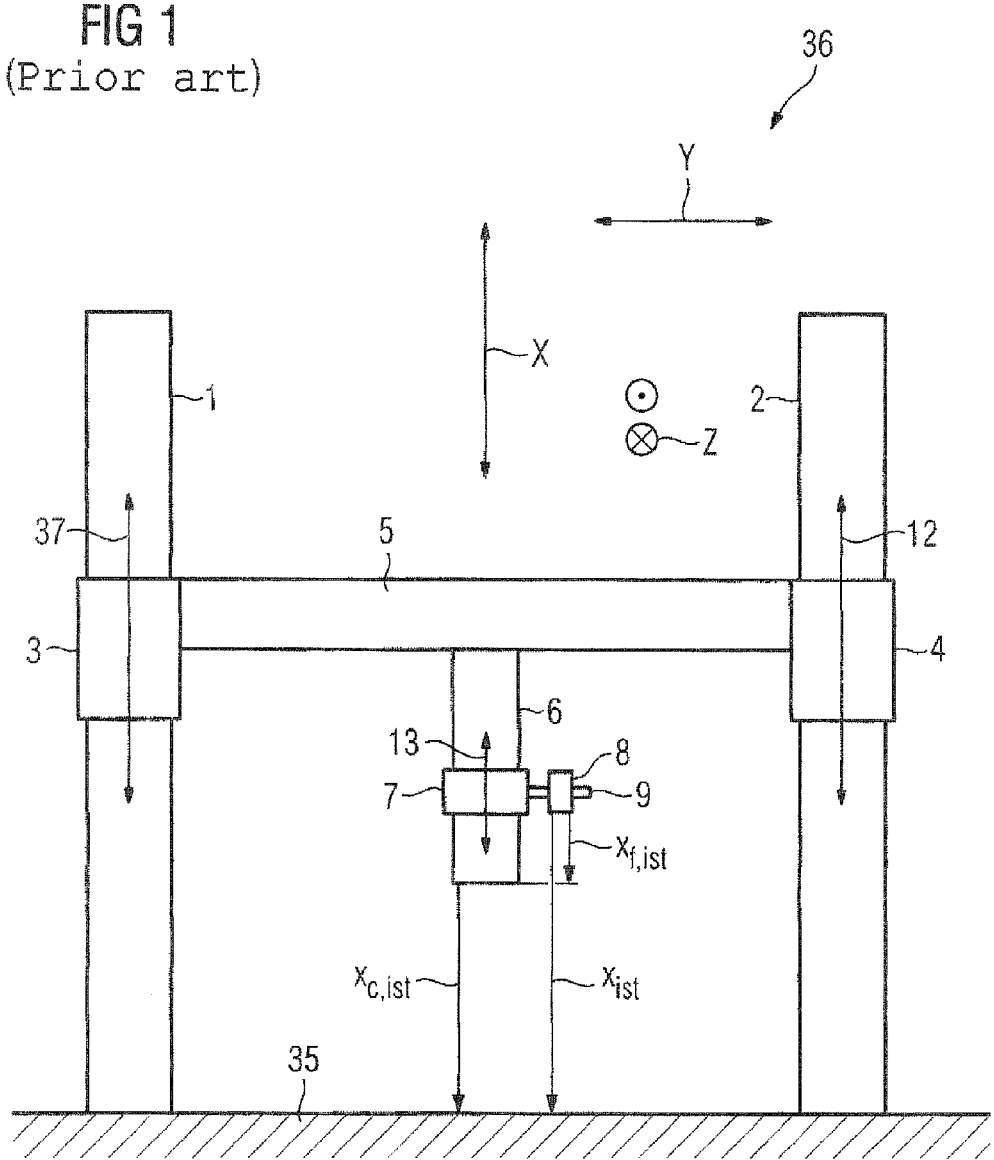
FIG. 1 shows a schematically illustrated known machine tool.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
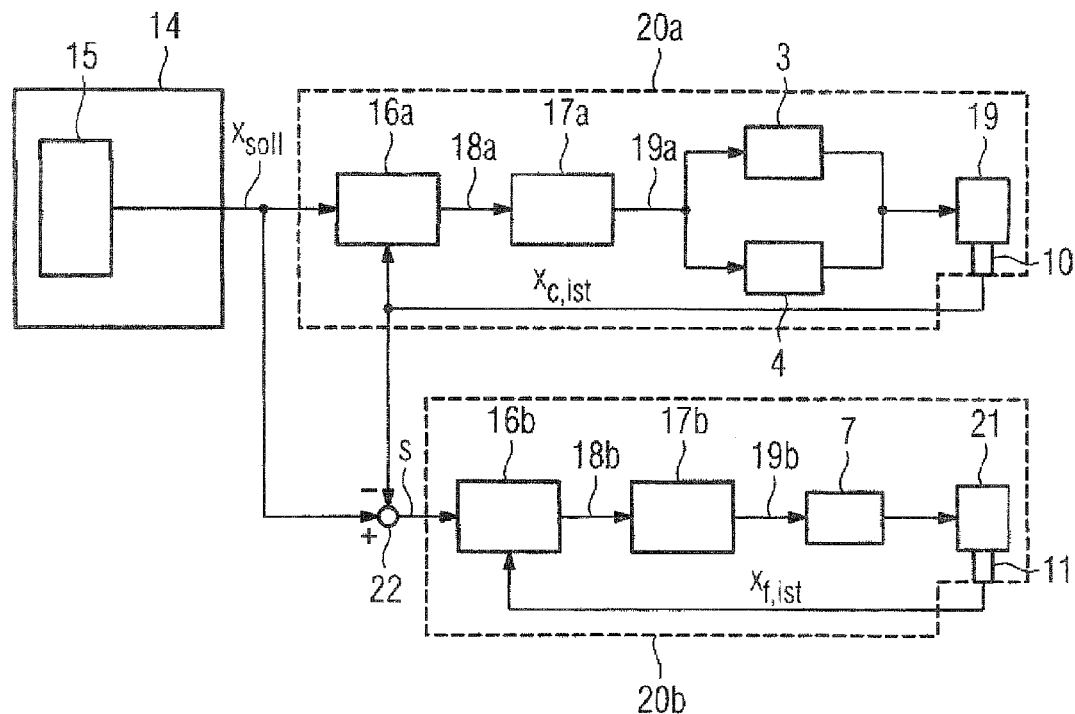
FIG. 2 shows a drive system which is known to be commercially available.
Figure 3:
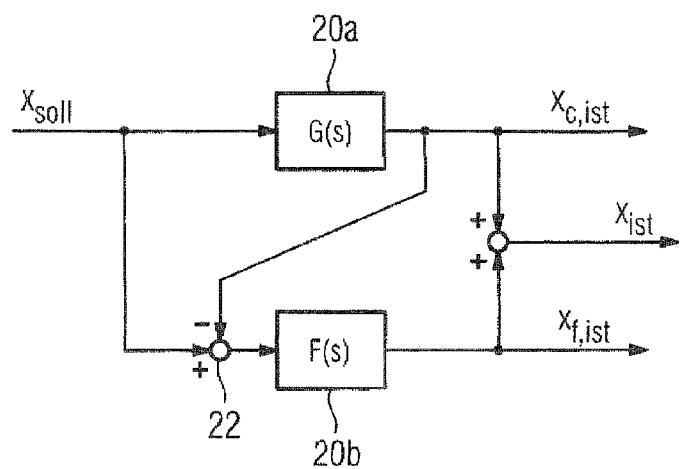
FIG. 3 shows a known drive system which is illustrated in a simplified manner in the form of a block function diagram.
Figure 8:
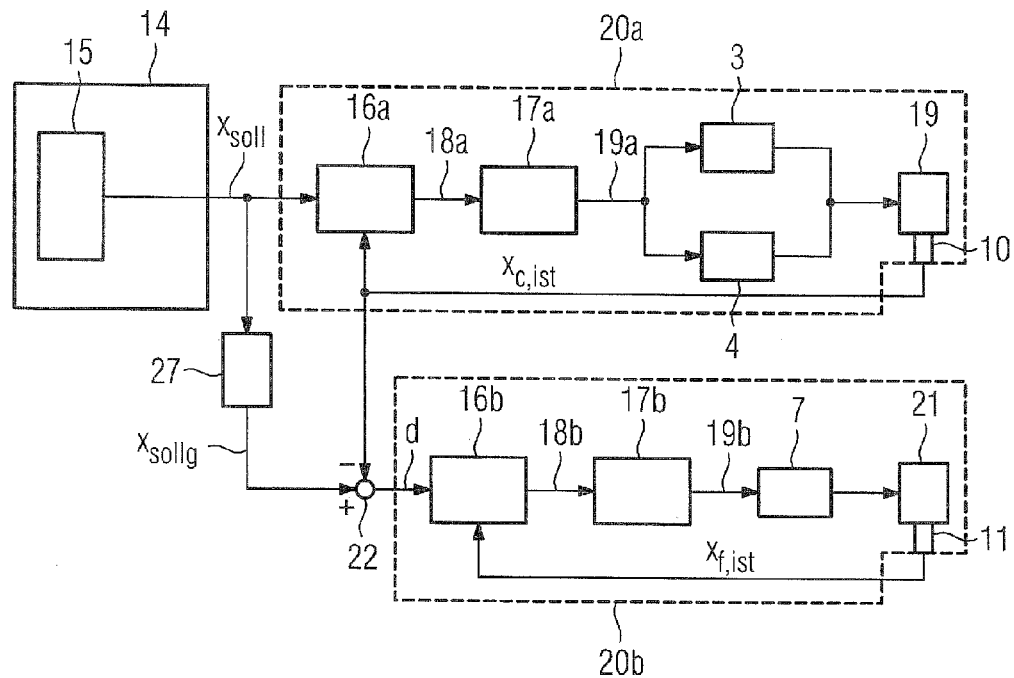
FIG. 8 shows a first embodiment of a drive system according to the invention.

Turning now to the drawing, and in particular to FIG. 8, there is shown a schematic block illustration of a first exemplary embodiment of the drive system according to the invention. In this case, the drive system according to the invention shown in FIG. 8 corresponds to the drive system known from the prior art according to FIG. 2, but a filter 27 having a frequency-dependent transfer function V(s) has been inserted according to the invention. In FIG. 8, the same elements are provided with the same reference symbols as in FIG. 2. According to the invention, the first desired variable $x_{soll}$ is filtered using the filter 27 and a filtered first desired variable $x_{sollg}$ is determined in this manner. The difference d between the filtered first desired variable $x_{sollg}$ and the first actual variable $x_{c,ist}$ is then determined by subtracting the first actual variable $x_{c,ist}$ from the filtered first desired variable $x_{sollg}$ using the subtractor 22. The difference d is supplied, as a controlled desired variable for regulating the movement of the second movement component of the machine element 8, to the second regulating means 16b.

Figure 9:
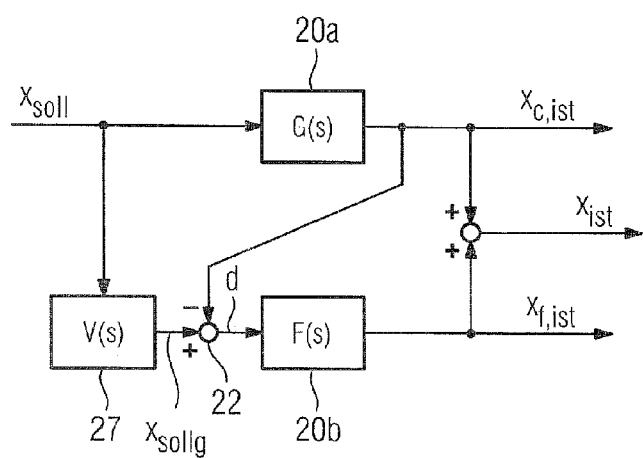
FIG. 9 shows a block function diagram of the first embodiment of a drive system according to the invention.

FIG. 9 illustrates the block function diagram associated with FIG. 8. In this case, the first drive shaft 20a has the transfer function G(s) and the second drive shaft 20b has the transfer function F(s). The filter 27 has the transfer function V(s). The reference symbols correspond to the elements illustrated in FIG. 8.

Temporal variables are designated using lower-case letters within the scope of this application. The Laplace transforms of the temporal variables are each represented with a capital letter below, that is to say the Laplace transform X(s) accordingly results from the variable x(t) which is dependent on time t:

$$X(s) := L[x(t)](s) := \int_0^\infty x(t) e^{-st} dt, \qquad (1)$$

where $$s = j \cdot 2 \cdot \pi \cdot f + \sigma \qquad (2),$$

where f is the frequency and j is the imaginary unit and σ is the real part of s.

The transfer function H(s) of the drive system according to the invention shown in FIG. 9 is thus $$H(s) = \frac{X_{ist}(s)}{X_{soll}(s)} = (V(s) - G(s)) \cdot F(s) + G(s). \tag{3}$$

A particularly great reduction in the contour errors can be achieved if the transfer function of the filter 27 is selected to be:

$$V(s) = 1 + G(s) - \frac{G(s)}{F(s)}. \tag{4}$$

When equation (4) is inserted into equation (3), the transfer function H(s) of the drive system is then $$H(s) = F(s) \tag{5},$$

that is to say the machine element 8 is moved using the dynamics of the second drive shaft 20b and the non-dynamic drive shaft, that is to say the sluggish drive shaft 20a, is apparently no longer present in terms of regulation. If the transfer functions G(s) and F(s) are causal, which is practically always the case, there is always a transfer function V(s) which can be achieved.

Figure 12:
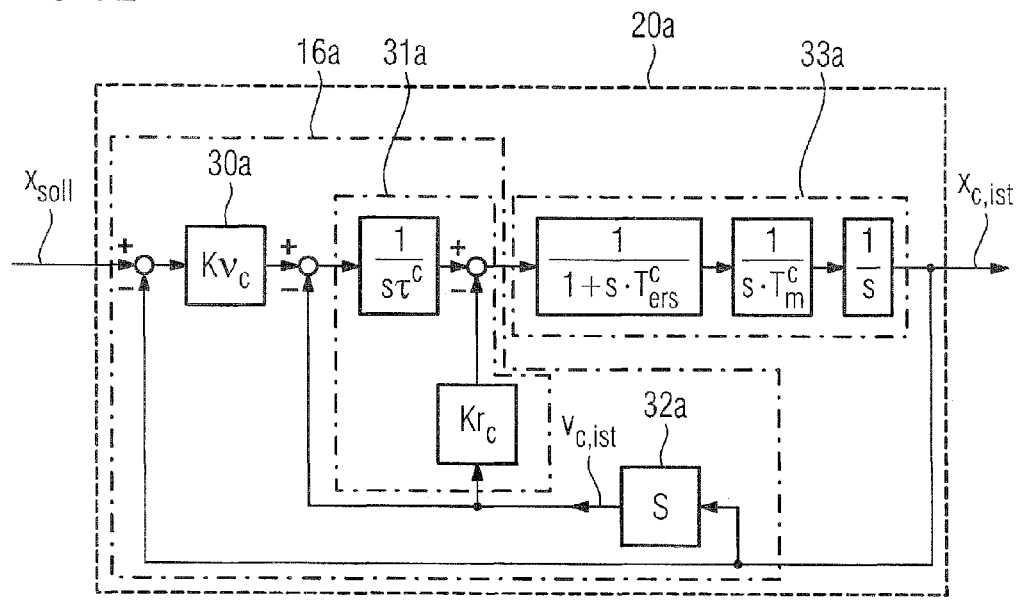
FIG. 12 shows a block diagram showing the regulation of the first drive shaft.

FIG. 12 illustrates a block diagram showing the regulation of the first drive shaft 20a. Within the scope of the exemplary embodiment, the regulating means 16a has a position regulator 30a and a speed regulator 31a in this case. The first power converter 17a as well as the two linear motors 3 and 4 and the load 19 are simulated using a simulation function block 33a. The first actual variable $x_{c,ist}$ is differentiated with respect to time t using the differentiator 32a and a first actual speed $v_{c,ist}$ is calculated in this manner. The round symbols illustrated in FIG. 12 are each subtractors which subtract one output variable from the other and output the difference. The functions indicated in function blocks (square boxes) are the transfer functions of the function blocks.

In this case, the index c denotes that it is a parameter of the first drive shaft 20a. The index c may be superscript or subscript in this case.

Within the scope of the exemplary embodiment, the following thus results for the transfer function G(s) of the first drive shaft 20a $$G(s) = \frac{X_{c,ist}(s)}{X_{soll}(s)} = \frac{1}{1 + s\frac{1}{Kv_c} + s^2\frac{1}{Kv_c}Kr_c\tau^c +} \tag{6}$$
$$s^3 \frac{1}{Kv_c}\tau^c T_m^c + s^4 \frac{1}{Kv_c} T_{ers}^c \tau^c T_m^c$$

where
$Kv_c$ is the regulating gain of the position regulator
$Kr_c$ is the regulating gain of the speed regulator
$T^c$ is the integration time constant of the speed regulator
$T_{ers}{}^c$ is the equivalent time constant of the current control loop
$T_m{}^c$ is the mechanical time constant.

Figure 13:
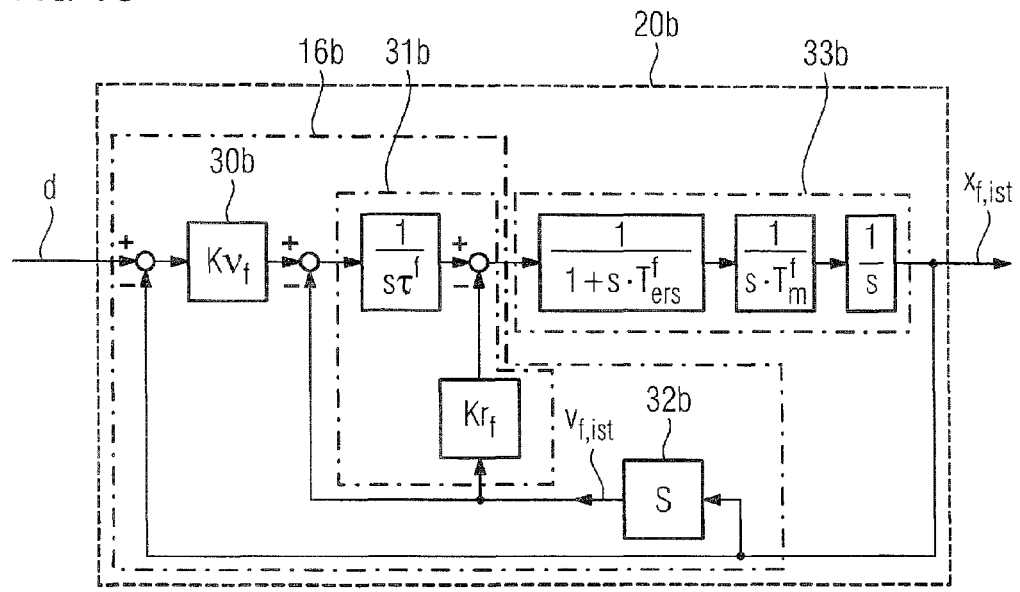
FIG. 13 shows a block diagram showing the regulation of the second drive shaft.

FIG. 13 illustrates a block diagram showing the regulation of the second drive shaft 20b. Within the scope of the exemplary embodiment, the regulating means 16b has a position regulator 30b and a speed regulator 31b in this case. The second power converter 17b as well as the linear motor 7 and the load 19 are simulated using a simulation function block 33b. The second actual variable $x_{f,ist}$ is differentiated with respect to time t using the differentiator 32b and a second actual speed $v_{f,ist}$ is calculated in this manner. The round symbols illustrated in FIG. 13 are each subtractors which subtract one output variable from the other and output the difference. The functions indicated in function blocks (square boxes) are the transfer functions of the function blocks.

In this case, the index f denotes that it is a parameter of the second drive shaft 20b. The index f may be superscript or subscript in this case.

Within the scope of the exemplary embodiment, the following thus results for the transfer function F(s) of the second drive shaft 20b $$F(s) = \frac{X_{f,ist}(s)}{D(s)} = \frac{1}{1 + s\frac{1}{Kv_f} + s^2\frac{1}{Kv_f}Kr_f\tau^f +} \tag{7}$$
$$s^3 \frac{1}{Kv_f}\tau^f T_m^f + s^4 \frac{1}{Kv_f} T_{ers}^f \tau^f T_m^f$$

where
$Kv_f$ is the regulating gain of the position regulator
$Kr_f$ is the regulating gain of the speed regulator
$T^f$ is the integration time constant of the speed regulator
$T_{ers}{}^f$ is the equivalent time constant of the current control loop
$T_m{}^f$ is the mechanical time constant
D(s) is the Laplace transform of the difference d (see FIG. 8 and FIG. 9).

By inserting equation (6) and equation (7) into equation (4), the transfer function V(s) of the filter 27 is thus:

$$V(s) = \frac{1 + s\left(\frac{1}{Kv_c} - \frac{1}{Kv_f}\right) + s^2\left(\frac{Kr_c\tau^c}{Kv_c} - \frac{Kr_f\tau^f}{Kv_f}\right) + s^3\left(\frac{\tau^c T_m^c}{Kv_c} - \frac{\tau^f T_m^f}{Kv_f}\right) + s^4\left(\frac{T_{erc}^c\tau^c T}{Kv_c} - \frac{T_{erc}^f\tau^f T}{Kv_f}\right)}{1 + s\frac{1}{Kv_c} + s^2\frac{Kr_c\tau^c}{Kv_c} + s^3\frac{\tau^c T_m^c}{Kv_c} + s^4\frac{T_{ers}^c\tau^c T_m^c}{Kv_c}}. \tag{8}$$

The transfer function V(s) can be achieved.

As seen from equation (8), it is easy to parameterize the filter.

An effective or very effective filter results depending on how accurately the transfer functions G(s) and F(s), which indicate the transfer response of the respectively associated drive shaft, are set up, with the result that a considerable or very considerable reduction in contour errors is achieved by the invention. If the quadratic and higher-order terms in equation (8) are disregarded, the transfer function V(s) of the filter is $$V(s) = \frac{1 + s\left(\frac{1}{Kv_c} - \frac{1}{Kv_f}\right)}{1 + s\frac{1}{Kv_c}}. \tag{9}$$

It has been shown that, even if the transfer function of the filter in the simplified form according to equation (9) is selected, there is still a very considerable reduction in contour errors.

The inverse Laplace transform (10) is defined as:

$$x(t) = L^{-1}[X(s)](t) := \frac{1}{2\pi j}\oint X(s)e^{st}ds, \; t > 0. \quad (10)$$

The so-called convolution rule of the Laplace transform is:

$$L^{-1}[X(s) \cdot Y(s)] = x(t) * y(t) = \int_0^t x(t-\tau) \cdot y(\tau)d\tau. \quad (11)$$

With the aid of equations (10) and (11), the filtered first desired variable $x_{sollg}$ is thus $$\begin{aligned} x_{sollg}(t) &= L^{-1}[X_{sollg}(s)](t) \quad (12)\\ &= L^{-1}[V(s) \cdot X_{soll}(s)](t)\\ &= L^{-1}[V(s)](t) * L^{-1}[X_{soll}(s)](t)\\ &= L^{-1}[V(s)](t) * x_{soll}(t), \; t > 0. \end{aligned}$$

Figure 4:
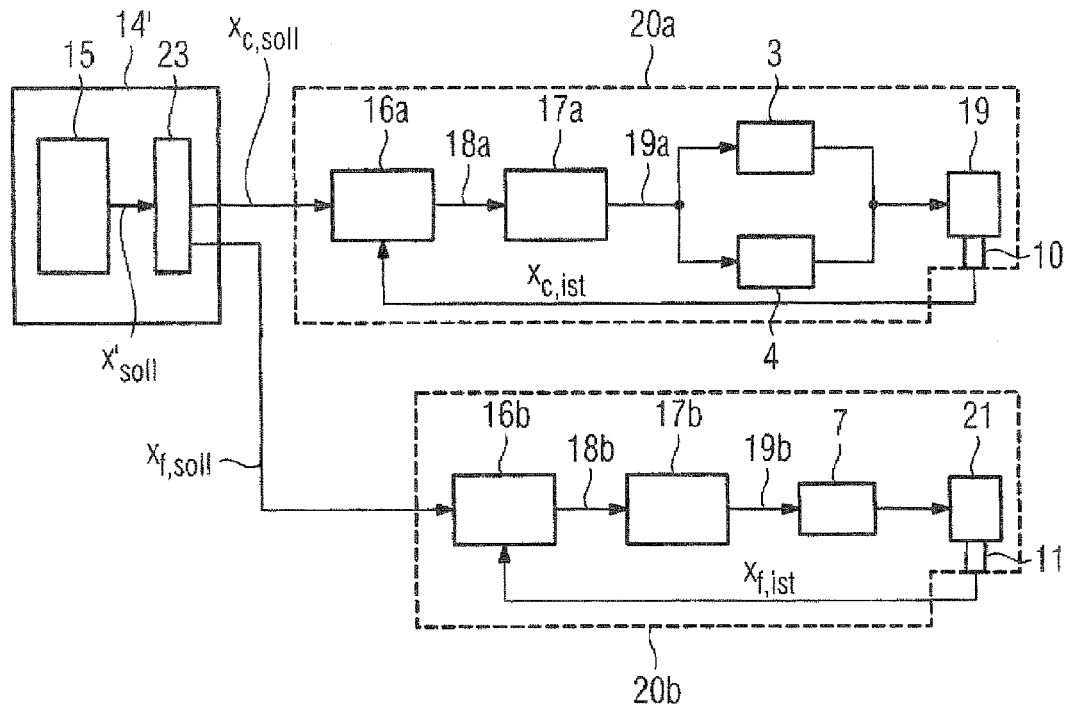
FIG. 4 shows another drive system which is known to be commercially available.
Figure 5:
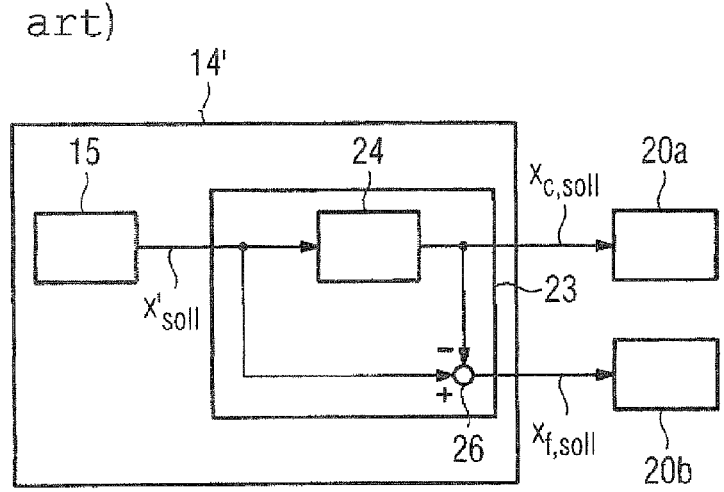
FIG. 5 shows a known control device.
Figure 6:
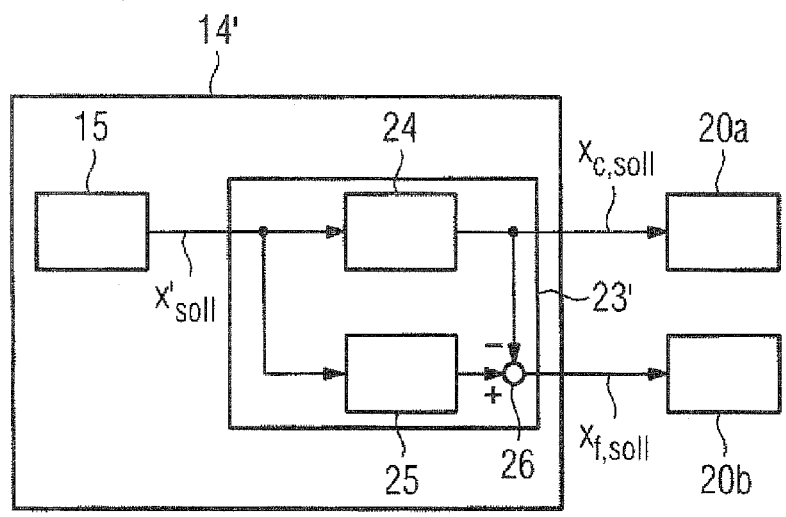
FIG. 6 shows another known control device.
Figure 7:
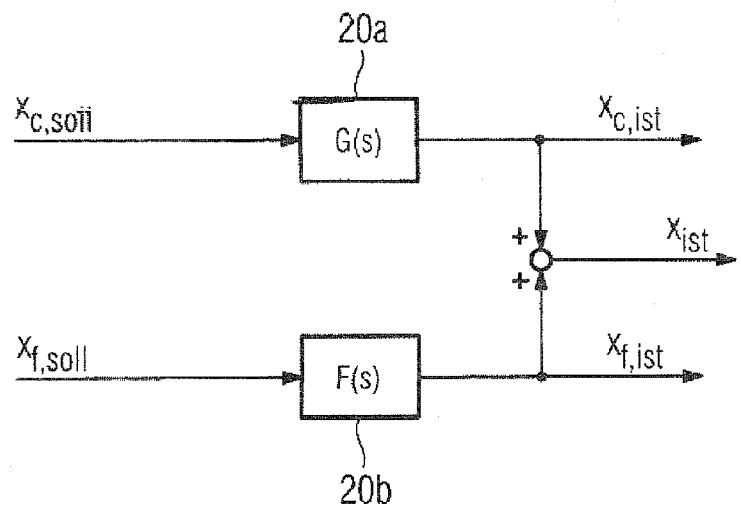
FIG. 7 shows another known drive system which is illustrated in a simplified manner.
Figure 10:
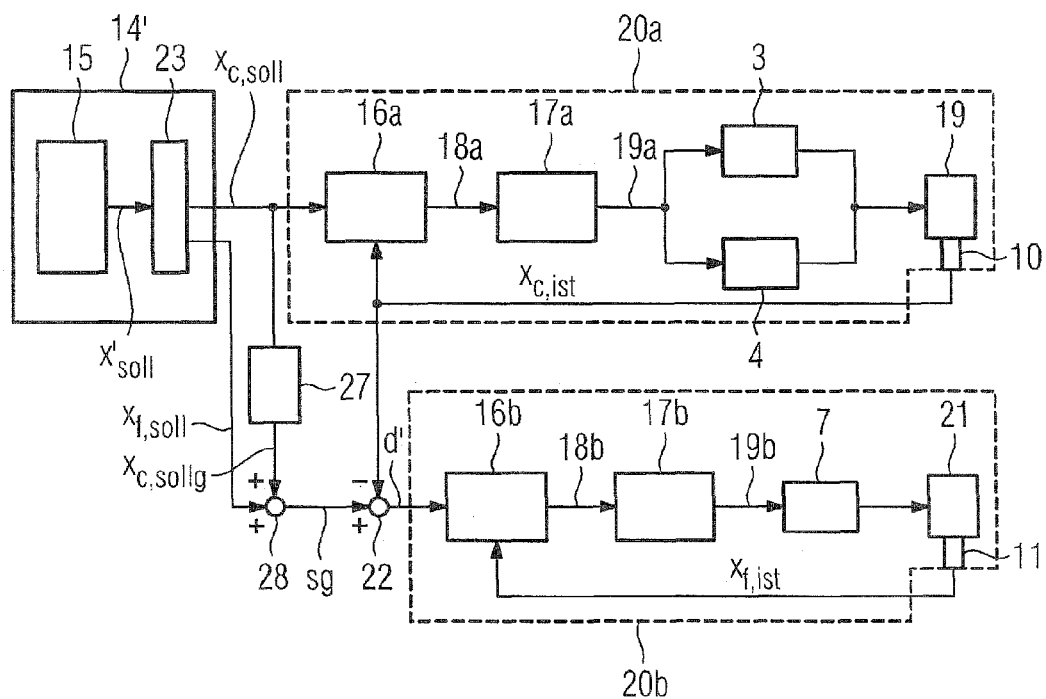
FIG. 10 shows a second embodiment of a drive system according to the invention.

FIG. 10 illustrates a schematic block illustration of a second exemplary embodiment of the drive system according to the invention. In this case, the drive system according to the invention shown in FIG. 10 corresponds to the drive system known from the prior art according to FIG. 4, but a filter 27 having a frequency-dependent transfer function V(s) has been inserted according to the invention. In FIG. 10, the same elements are provided with the same reference symbols as in FIG. 4. According to the invention, the first desired variable $x_{c,soll}$ is filtered using the filter 27 and a filtered first desired variable $x_{c,sollg}$ is determined in this manner.

The sum of the filtered first desired variable $x_{c,sollg}$ and a second desired variable $x_{f,soll}$ is then determined and a sum variable sg is determined in this manner. The difference d' between the sum variable sg and the first actual variable $x_{c,ist}$ is then determined by subtracting the first actual variable $x_{c,ist}$ from the sum variable sg. The difference d' is supplied, as a controlled desired variable for regulating the second movement component, to the second regulating means 16b.

Figure 11:
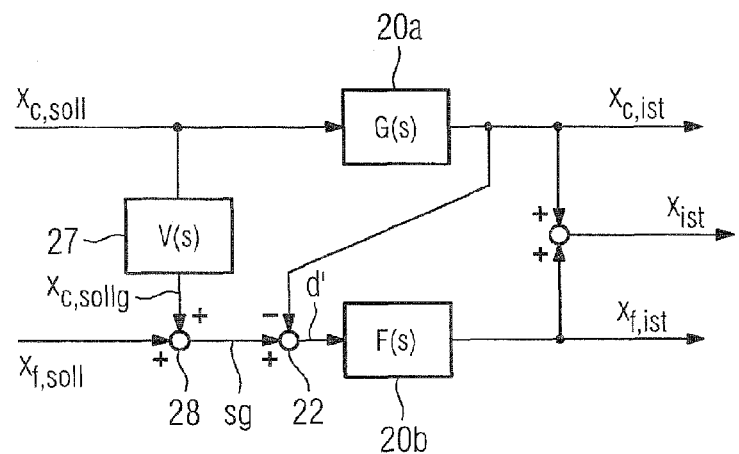
FIG. 11 shows a block function diagram of the second embodiment of a drive system according to the invention.

FIG. 11 illustrates the block function diagram associated with FIG. 10. In this case, the first drive shaft 20a has the transfer function G(s) and the second drive shaft 20b has the transfer function F(s). The filter 27 has the transfer function V(s). The reference symbols correspond to the elements illustrated in FIG. 8.

Equations (1), (2), (4) and (6) to (9) and the above relevant description relating to the first exemplary embodiment correspondingly apply to the transfer functions G(s), H(s) and to the transfer function V(s) of the filter 27 of the second exemplary embodiment, with the result that at this point reference is made to the description relating to the first exemplary embodiment, in which case $x_{soll}(s)$ should be replaced with $x_{c,soll}(s)$ in equation (6) and D(s) should be replaced with D'(s) in equation (7). D'(s) is the Laplace transform of the difference d' (see FIG. 10 and FIG. 11). The transfer function V(s) of the filter 27 according to FIG. 10 and FIG. 11 (second exemplary embodiment) corresponds to the transfer function V(s) of the filter 27 according to FIG. 8 and FIG. 9 (first exemplary embodiment).

In accordance with equations (10) and (11), the filtered first desired variable $x_{c,sollg}$ in the second exemplary embodiment is thus:

$$\begin{aligned} x_{c,sollg}(t) &= L^{-1}[X_{c,sollg}(s)](t) \quad (13)\\ &= L^{-1}[V(s) \cdot X_{c,soll}(s)](t)\\ &= L^{-1}[V(s)](t) * L^{-1}[X_{c,soll}(s)](t)\\ &= L^{-1}[V(s)](t) * x_{c,soll}(t), \; t > 0. \end{aligned}$$

It is noted at this point that the first regulating means 16a, the second regulating means 16b, the subtractor 22 and the adder 28 are generally in the form of executable software code which is executed by a single processor or a plurality of processors. In this case, the processors can be physically arranged in an individual component or in different components of the drive system.

It is also noted at this point that the mathematical derivations cited above were set up for the very general continuous-time case. For the special case of discrete-time systems, the general continuous transfer function V(s) of the filter changes into the discrete-time transfer function $V(z=e^{sT})$, where T is the sampling time.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for moving a machine element of an automation machine having a first drive shaft performing a first movement component and a second drive shaft performing a second movement component, said first and second movement component having a common direction and being controlled by separate first and second controllers, the method comprising the steps of:
   supplying to the first controller as a desired control variable a first desired value for an overall movement, which is composed of the first and second movement components,
   supplying to the first controller as an actual control variable a first actual value representing the first movement component,
   filtering the first desired value using a filter having a frequency-dependent transfer function to generate a filtered first desired variable,
   determining a difference between the filtered first desired value and the first actual value, and
   supplying the difference to the second controller as a desired control variable for controlling the second movement component,
   wherein the frequency-dependent transfer function is $$V(s) = 1 + G(s) - \frac{G(s)}{F(s)},$$

wherein G(s) is a transfer function of the first drive shaft and F(s) is a transfer function of the second drive shaft and $s = j \cdot 2\pi \cdot f + \sigma,$ wherein f is a frequency and j is the imaginary unit and σ is the real part of s.

2. The method of claim 1, wherein the automation machine is a machine tool.

3. A method for moving a machine element of an automation machine having a first drive shaft performing a first movement component and a second drive shaft performing a second movement component, said first and second movement component having a common direction and being controlled by separate first and second controllers, the method comprising the steps of:
   supplying to the first controller as a desired control variable a first desired value for controlling the first movement component,
   supplying to the first controller as an actual control variable a first actual value representing the first movement component,
   filtering the first desired value using a filter having a frequency-dependent transfer function to generate a filtered first desired value,
   adding the filtered first desired value and a second desired value to form a sum,
   determining a difference between the formed sum and the first actual value, and
   supplying the difference to the second controller as a desired control variable for controlling the second movement component,
   wherein the frequency-dependent transfer function is $$V(s) = 1 + G(s) - \frac{G(s)}{F(s)},$$

wherein G(s) is a transfer function of the first drive shaft and F(s) is a transfer function of the second drive shaft and $s = j \cdot 2 \cdot \pi \cdot f + \sigma,$ wherein f is a frequency and j is the imaginary unit and σ is the real part of s.

4. The method of claim 3, wherein the automation machine is a machine tool.

5. A drive system for moving a machine element of an automation machine, comprising:
   a first drive shaft moving the machine element with a first movement component and a second drive shaft moving the machine element with a second movement component in a common direction relative to the first movement component,
   a first controller controlling movement of the first drive shaft and a second controller controlling movement of the second drive shaft, wherein the first controller receives a first desired variable for the overall movement, which is composed of the first and second movement components, and a first actual value representing the first movement component as an actual control variable,
   a filter having a frequency-dependent transfer function filtering the first desired variable and generating a filtered first desired variable, and
   a subtractor forming a difference between the filtered first desired variable and the first actual value and supplying the difference to the second controller as a desired control variable for controlling the second movement component of the second drive shaft,"
wherein the frequency-dependent transfer function of the filter is $$V(s) = 1 + G(s) - \frac{G(s)}{F(s)},$$

wherein G(s) is a transfer function of the first drive shaft and F(s) is a transfer function of the second drive shaft and $s = j \cdot 2 \cdot \pi \cdot f + \sigma,$ wherein f is a frequency and j is the imaginary unit and 94 is the real part of s.

6. The drive system of claim 5, wherein the automation machine is a machine tool.

7. A drive system for moving a machine element of an automation machine, comprising:
   a first drive shaft moving the machine element with a first movement component and a second drive shaft moving the machine element with a second movement component in a common direction relative to the first movement component,
   a first controller controlling movement of the first drive shaft and a second controller controlling movement of the second drive shaft, wherein the first controller receives a first desired variable and a first actual value as control variables for controlling the first movement component,
   a filter having a frequency-dependent transfer function filtering the first desired variable and generating a filtered first desired variable,
   an adder adding the filtered first desired variable and a second desired variable to form a sum; and
   a subtractor forming a difference between the sum and the first actual value and supplying the difference to the second controller as a desired control variable for controlling the second movement component of the second drive shaft,
   wherein the frequency-dependent transfer function of the filter is $$V(s) = 1 + G(s) - \frac{G(s)}{F(s)},$$

wherein G(s) is a transfer function of the first drive shaft and F(s) is a transfer function of the second drive shaft and $s = j \cdot 2 \cdot \pi \cdot f + \sigma,$ wherein f is a frequency and j is the imaginary unit and σ is the real part of s.

8. The drive system of claim 7, wherein the automation machine is a machine tool.

* * * * *

UNITED STATES PATENT AND TRADEMARK OFFICE
CERTIFICATE OF CORRECTION

PATENT NO. : 8,374,706 B2
APPLICATION NO. : 13/024699
DATED : February 12, 2013
INVENTOR(S) : Marco Bock et al.

It is certified that error appears in the above-identified patent and that said Letters Patent is hereby corrected as shown below:

In column 12, line 17 delete "94" and replace with -- σ --.

Signed and Sealed this
Nineteenth Day of March, 2013

Teresa Stanek Rea
*Acting Director of the United States Patent and Trademark Office*